(12) United States Patent
Takeuchi et al.

(10) Patent No.: US 6,587,503 B1
(45) Date of Patent: Jul. 1, 2003

(54) INFORMATION PROCESSING APPARATUS AND METHOD

(75) Inventors: Isao Takeuchi, Tokyo (JP); Masakatsu Toyoshima, Kanagawa (JP); Taku Yamagata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/455,245

(22) Filed: Dec. 6, 1999

(30) Foreign Application Priority Data

Dec. 8, 1998 (JP) .......................................... 10-348581

(51) Int. Cl.[7] .............................................. H04B 17/00
(52) U.S. Cl. ....................... 375/227; 375/228; 375/326; 375/365
(58) Field of Search ................................ 375/224, 227, 375/228, 326, 365; 370/514; 455/226.3

(56) References Cited

U.S. PATENT DOCUMENTS

| 4,327,356 A | * | 4/1982 | Gilliland ..................... 327/100 |
| 4,835,790 A | * | 5/1989 | Yoshida et al. ............. 375/227 |
| 5,317,599 A | * | 5/1994 | Obata .......................... 329/304 |
| 6,021,159 A | * | 2/2000 | Nakagawa .................. 329/309 |

* cited by examiner

*Primary Examiner*—Amanda T. Le
(74) *Attorney, Agent, or Firm*—Jay H. Maioli

(57) ABSTRACT

An information processing apparatus in which an eye center measuring unit determines a code judgment point from a peak timing signal supplied from a timing signal generation circuit and an amplitude signal supplied from an interpolator and detected by an amplitude detector, and outputs it to a multiplier via an amplifier, a subtracter, and a reciprocal generating unit. A zero cross point measuring unit determines a code change point from a zero cross timing signal supplied from a timing signal generation circuit and an amplitude signal supplied from the interpolator and detected by the amplitude detector, and outputs it to the multiplier via a subtracter. The multiplier multiplies the supplied signals, and a dB converter converts a supplied signal into a signal in decibels and outputs the signal to a display circuit.

10 Claims, 16 Drawing Sheets

INFORMATION PROCESSING APPARATUS AND METHOD

BACKGROUND OF THE INVENTION

1. Field of the Invention

The present invention relates to an information processing apparatus and method, and more particularly to an information processing apparatus and method which enable a C/N (Carrier to Noise) ratio to be detected at high speed by detecting the difference between levels at a code judgment point (a place where an eye is open in eye pattern observation) and a code change point (zero cross point).

2. Description of Related Art

When receiving radio waves and detecting a C/N ratio from received signals, it has been a conventional practice to detect an error occurring during demodulation, or a vector error from an ideal symbol constellation, that is, a deviation from an ideal symbol point.

However, to determine a C/N ratio by thus detecting an error occurring during demodulation, or a vector error from an ideal symbol constellation, that is, a deviation from an ideal symbol point, received signals must be temporarily demodulated. Therefore, since carrier frequency synchronization must be completely taken, a C/N ratio is time-consuming to detect, so that there has been a problem that it is difficult to detect a C/N ratio at high speed.

SUMMARY OF THE INVENTION

The present invention has been made in view of such a situation and an object thereof is to detect a C/N ratio at high speed.

An information processing apparatus according to one aspect of the present invention comprises: amplitude value detection means for detecting an amplitude value from a received signal; code judgment detection means for detecting a code judgment point based on an amplitude value detected by the amplitude value detection means; code change point detection means for detecting a code change point based on an amplitude value detected by the amplitude value detection means; and noise detection means for detecting signal noise from a code judgment point detected by the code judgment detection means and a code change point detected by the code change point detection means.

An information processing method according to another aspect of the present invention comprises: an amplitude value detection step for detecting an amplitude from a received signal; a code judgment detection step for detecting a code judgment point based on an amplitude value detected by the amplitude value detection step; a code change point detection step for detecting a code change point based on an amplitude value detected by the amplitude value detection step; and a noise detection step for detecting signal noise from a code judgment point detected by the code judgment detection step and a code change point detected by the code change point detection step.

In the information processing apparatus according to one aspect of the present invention and the information processing method according to another aspect of the present invention, an amplitude value is detected by a received signal, a code judgment point is detected based on the detected amplitude value, a code change point is detected based on the detected amplitude value, and signal noise is detected from the detected code change judgment point and code change point.

According to an information processing apparatus, an information processing method, and an information medium of the present invention, since a code judgment point and a code change point are detected from a received signal, signal noise can be estimated.

DESCRIPTION OF THE PREFERRED EMBODIMENTS

Figure 1:
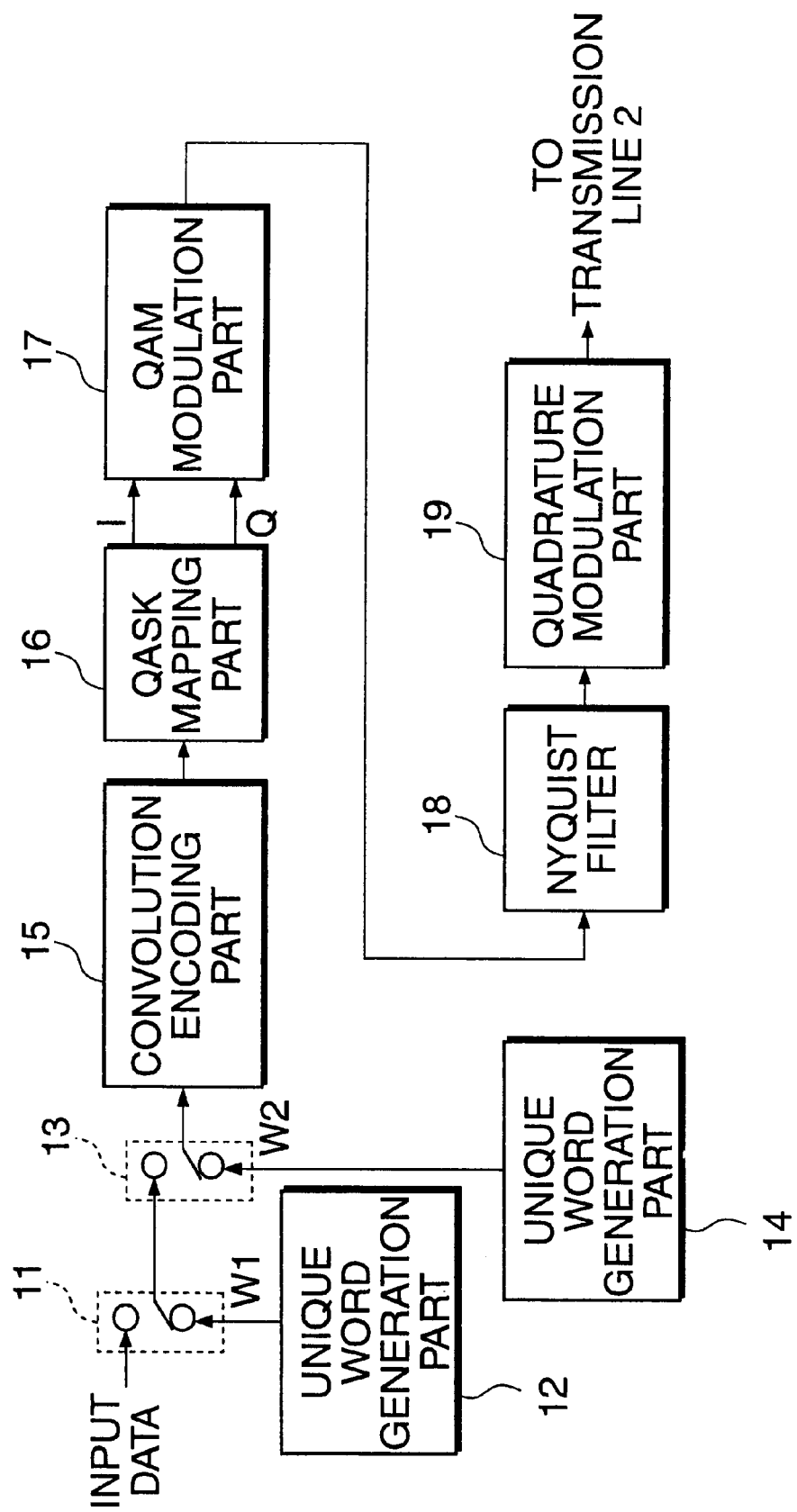
FIG. 1 is a block diagram showing a configuration of a sending apparatus 1.

FIG. 1 shows a configuration of a sending apparatus 1. A send signal is supplied to a switch 11. A unique word generation part 12 generates a unique word W1 (will be described in detail later with reference to FIG. 13) and supplies it to the switch 11. The switch 11 switches an output between a supplied signal to be sent and the unique word W1 supplied from the unique word generation part 12, and supplies the output to the switch 13. The switch 13 selects one of the input data or unique word W1 supplied from the switch 11 and a unique word W2 (will be described in detail later with reference to FIG. 13) generated by a unique word generation part 14, and outputs it to a convolution encoding part 15.

The convolution encoding part 15 performs convolution encoding for the data supplied from the switch 13 at an encoding rate of 0.5, and supplies the result to a QASK (Quadrature Amplitude Shift Keying) mapping part 16. The QASK mapping part 16 mapping-modulates the data supplied from the convolution encoding part 15 to a predetermined signal and outputs an in-phase component I signal thereof and a quadrature component Q signal to a QAM (Quadrature Amplitude Modulation) modulation part 17. The QAM modulation part 17 QAM-modulates the supplied in-phase component I signal and quadrature component Q signal and supplies the result to a Nyquist filter 18. The Nyquist filter 18 filters the supplied signal and supplies the filtered signal to the quadrature modulation part 19. The quadrature modulation part 19 quadrature-modulates the supplied signal, generates a RF (Radio Frequency) signal, and sends it to a transmission line 2.

Figure 2:
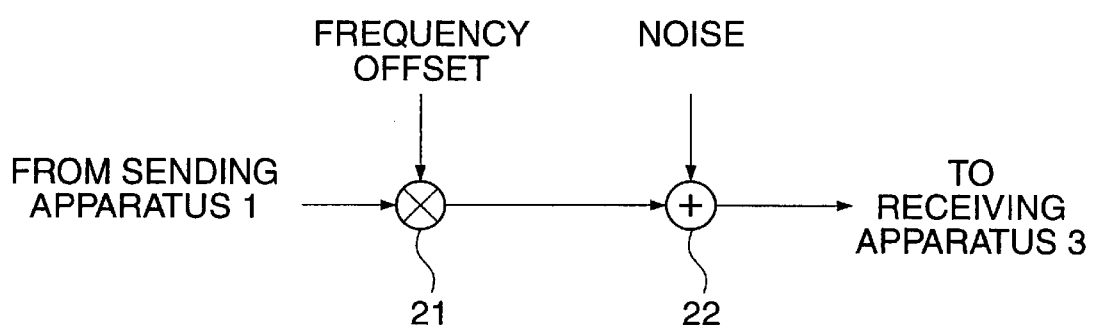
FIG. 2 is a block diagram showing a configuration of a transmission line 2.

FIG. 2 is a schematic diagram of a transmission line such as a satellite line. A RF signal sent from a sending apparatus 1 is supplied to a multiplying part 21. The multiplying part 21 multiplies the supplied signal by a frequency offset and outputs the result to an adding part 22. The adding part 22 adds noise to the supplied signal and sends the result to a receiving apparatus 3.

Figure 3:
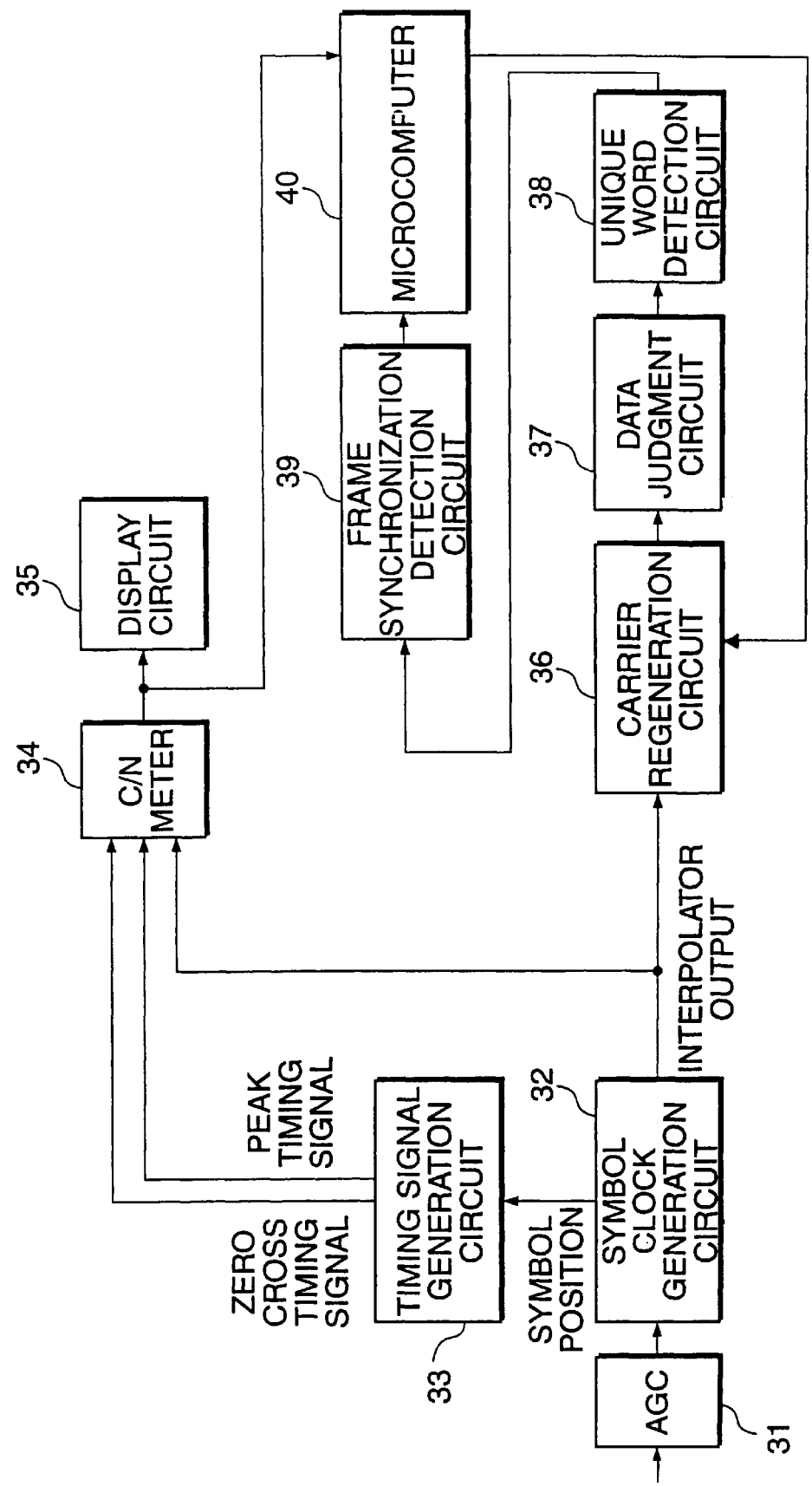
FIG. 3 is a block diagram showing a configuration of a receiving apparatus 3 to which the present invention is applied.

FIG. 3 shows a configuration of a receiving apparatus 3. A receiving RF signal is supplied to an AGC (Automatic Gain Controller) 31. The AGC 31 controls the amplitude of the supplied signal to a constant level and outputs it to a symbol clock generation circuit 32. The symbol clock generation circuit 32 (will be described in detail later with reference to FIG. 13) generates a symbol position (symbol clock) and outputs it to a timing signal generation circuit 33. The symbol clock generation circuit 32 interpolates the signal supplied from the AGC 31 synchronously with the symbol position internally generated and outputs the interpolated signal to a C/N meter 34 and a carrier regeneration circuit 36.

The timing signal generation circuit 33 generates a zero cross timing signal and a peak timing signal from the symbol position supplied from the symbol clock generation circuit 32, and outputs them to the C/N meter 34.

The C/N meter 34 (will be described in detail later with reference to FIGS. 5 to 7) determines a code determination point and a code change point from the supplied signals and outputs a power ratio thereof to a display circuit 35. The display circuit 35 displays the supplied signals.

The carrier regeneration circuit 36 (will be described in detail later with reference to FIGS. 8 and 9) regenerates a carrier from the interpolated signal supplied from the symbol clock generation circuit 32 and outputs it to a data judgment circuit 37.

The data judgment circuit 37 judges a symbol (data) from the signal supplied from the carrier regeneration circuit 36 and outputs the judged symbol to a unique word detection circuit 38.

The unique word detection circuit 38 (will be described in detail later with reference to FIG. 10) takes the correlation between a preset unique word and the signal supplied from the data judgment circuit 37, and when the correlation value becomes equal to or greater than a predetermined threshold value, outputs to a frame synchronization detection circuit 39 a detection signal indicating that a unique word is detected.

Figure 14:
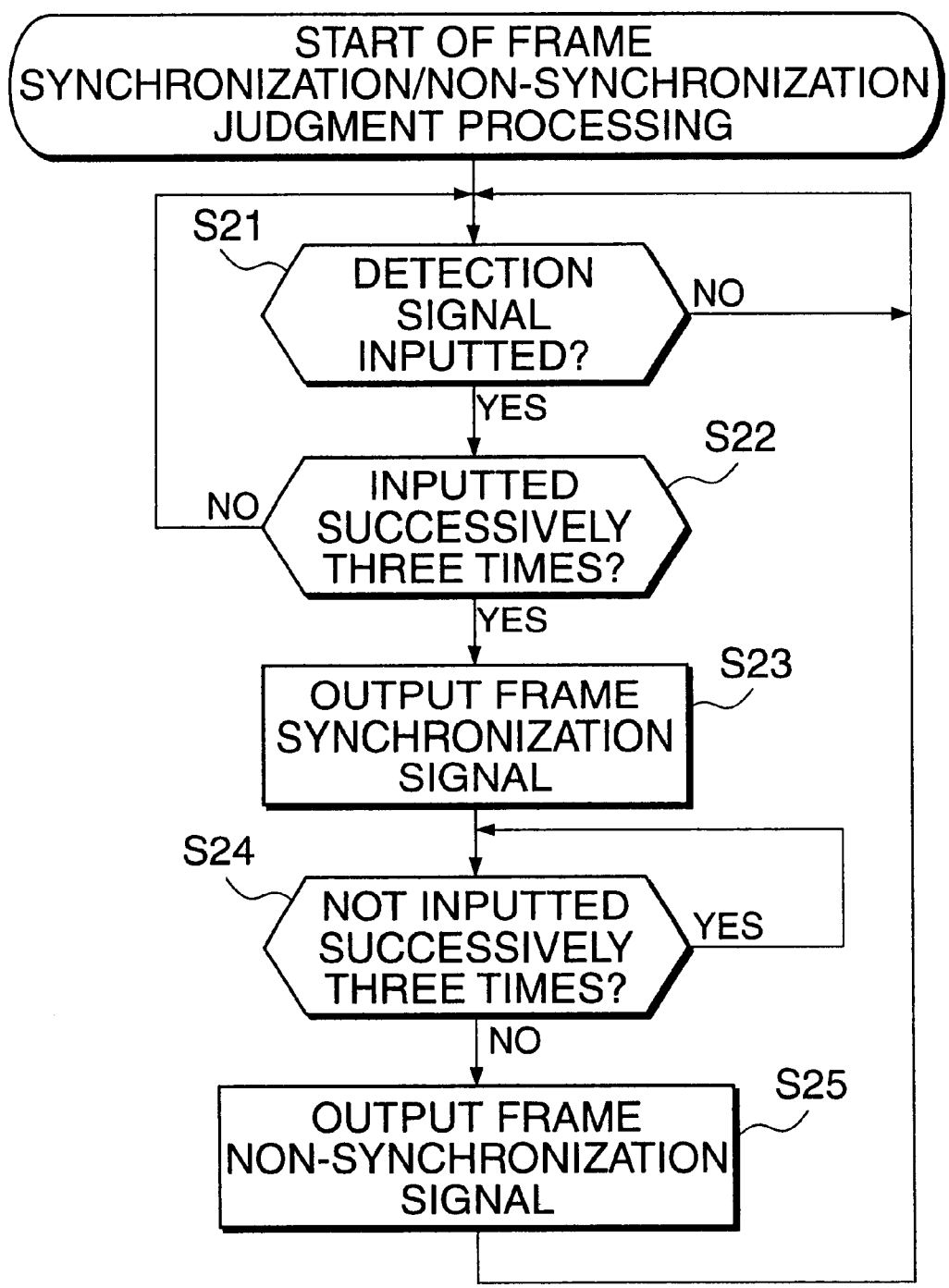
FIG. 14 is a flowchart for explaining the operation of a frame synchronization detection circuit 39 of FIG. 3.

The frame synchronization detection circuit 39 (will be described in detail later with reference to FIG. 14) detects a frame synchronization signal supplied from the signal supplied from the unique word detection circuit 38 and outputs the detection result to a microcomputer 40.

The microcomputer 40 judges, from the signal supplied from the C/N meter 34 and the detection result supplied from the frame synchronization detection circuit 39, whether frame synchronization is established, and outputs a signal for changing a sweep frequency step width to the carrier regeneration circuit 36.

Figure 4:
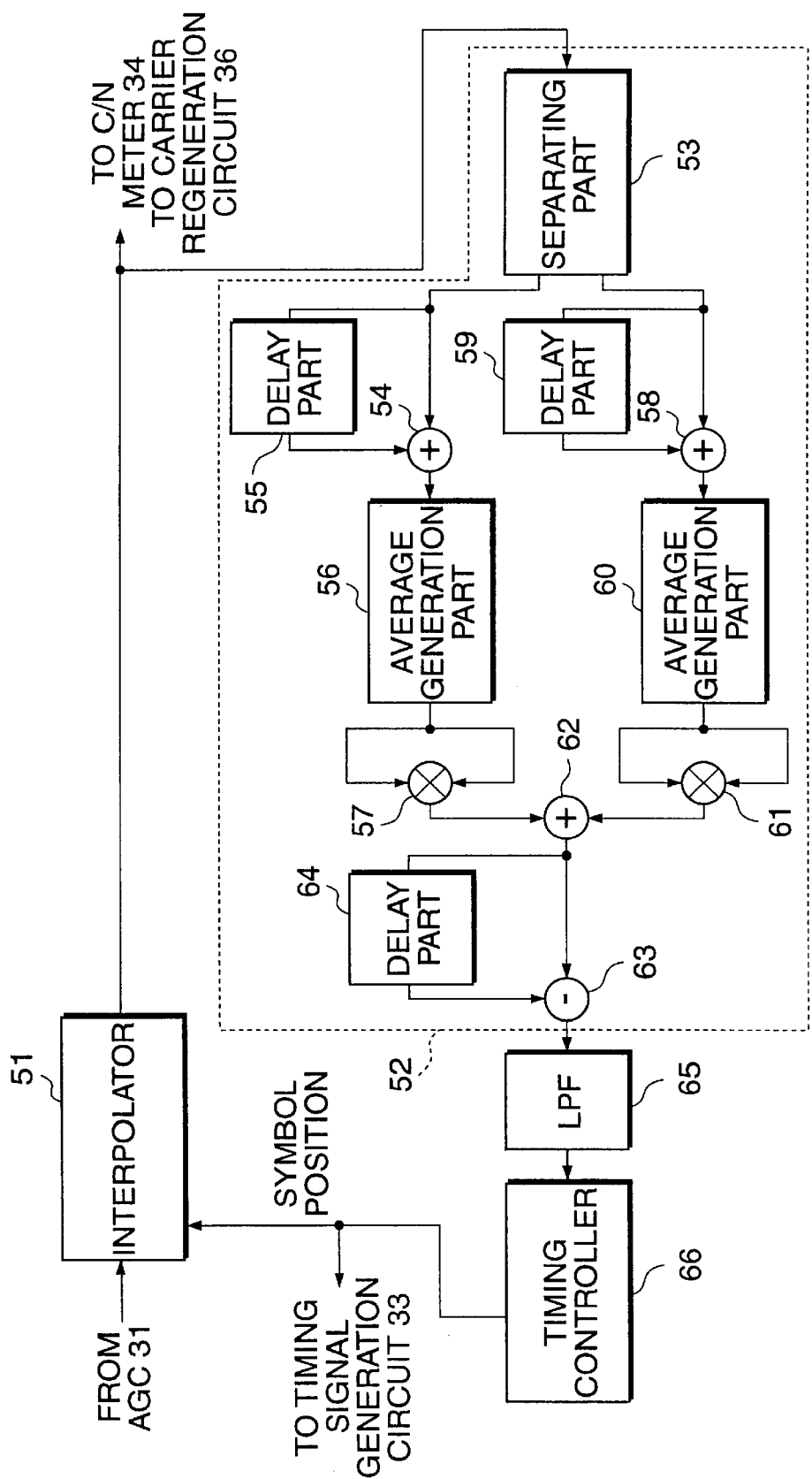
FIG. 4 is a block diagram showing a configuration of a symbolic clock generation circuit 32 of FIG. 3.

FIG. 4 shows a configuration of the symbol clock generation circuit 32 of FIG. 3. An interpolator 51 interpolates the signal supplied from the AGC 31 synchronously with a symbol position supplied from a timing controller 66 described later and outputs the interpolated signal to the C/N meter 34, the carrier regeneration circuit 36, and an error detector 52.

The error detector 52 detects an error of the supplied signal. A separating part 53 of the error detector 52 separates the signal supplied from the interpolator 51 into an in-phase component I signal and a quadrature component Q signal, outputs the in-phase component I signal to an adding part 54 and a delay part 55, and outputs the quadrature component Q signal to an adding part 58 and a delay part 59.

An adding part 54 adds the in-phase component I signal supplied from the separating part 53 and a signal delayed by a one-sample clock period by a delay part 55 and outputs the result to an average value generation part 56. The average value generation part 56 finds the average of the supplied signals and outputs it to the multiplying part 57. The multiplying part 57 squares the supplied signals and outputs the result to an adding part 62.

On the other hand, the adding part 58 adds the quadrature component Q signal supplied from the separating part 53 and a signal delayed by a one-sample clock period by the delay part 59 and outputs the result to an average generation part 60. The average generation part 60 finds the average of the supplied signals and outputs the result to a multiplying part 61. The multiplying part 61 squares the supplied signal and outputs the result to an adding part 62.

The adding part 62 adds the signal supplied from the multiplying part 57 and the signal supplied from the multiplying part 61 and outputs the result to a subtracting part 63 and a delay part 64. The subtracting part 63 performs subtraction between the signal supplied from the adding part 62 and a signal delayed by a one-sample clock period by a delay part 64. Thereby, an error between the signal value before a one-sample clock period and a current value is calculated. The error is outputted to LPF (Low Pass Filter) 65.

The LPF 65 cuts high-frequency components of the supplied error signal, passes only low-frequency components, and outputs the signal to a timing controller 66. The timing controller 66 generates a symbol position from the supplied signal and outputs it to the interpolator 51 and the timing signal generation circuit 33.

Figure 5:
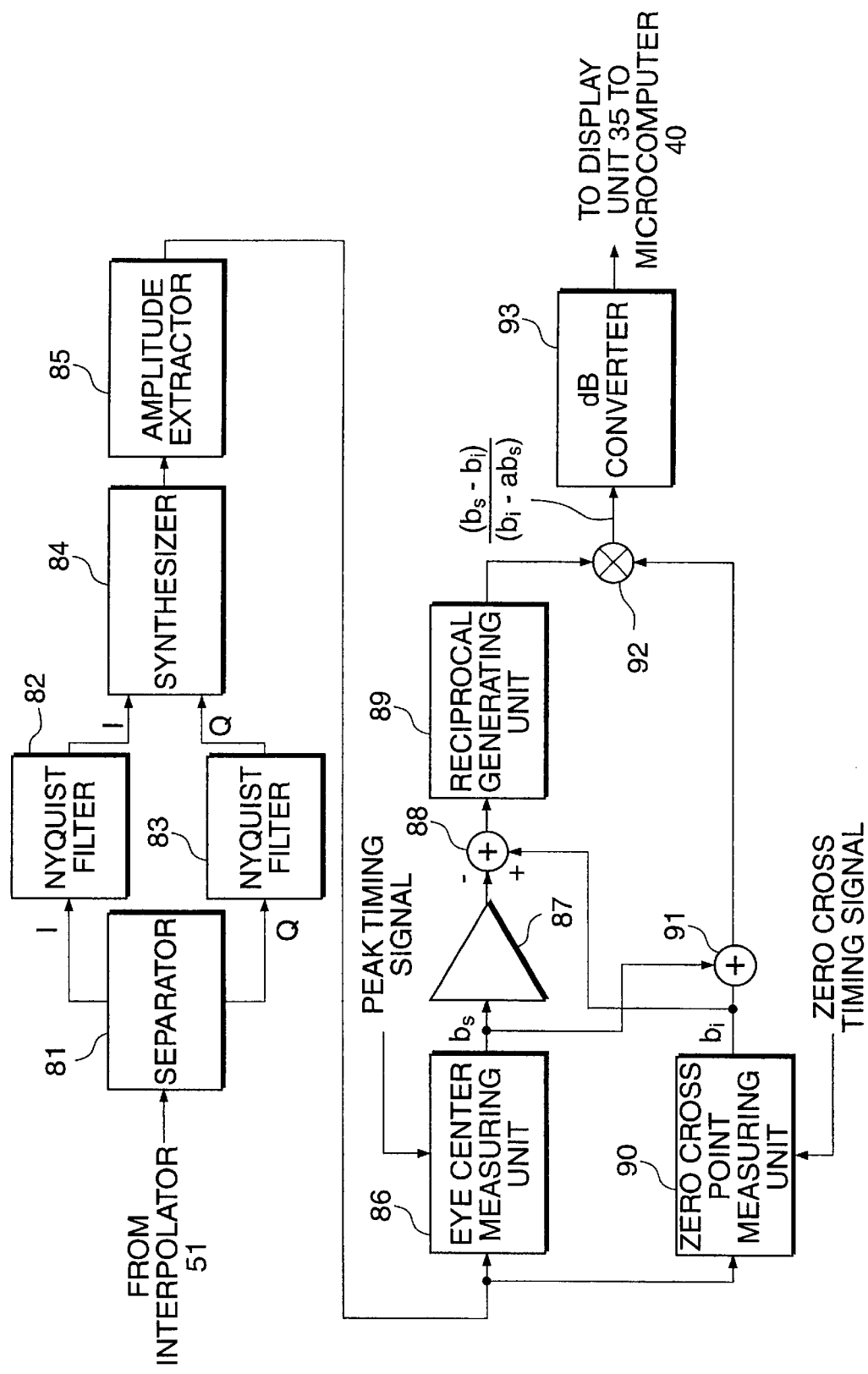
FIG. 5 is a block diagram showing a configuration of a C/N meter 34 of FIG. 3.

FIG. 5 shows a configuration of the C/N meter 34 of FIG. 3. An interpolated signal outputted from the interpolator 51 of the symbol clock generation circuit 32 is supplied to a separator 81. The separator 81 separate the supplied signal into an in-phase component I signal and a quadrature component Q signal and outputs the in-phase component I signal to a Nyquist filter 82 and the quadrature component Q signal to a Nyquist filter 83. The Nyquist filter 82 filters the supplied in-phase component I signal and outputs the filtered signal to a synthesizer 84. The Nyquist filter 83 filters the supplied quadrature component Q signal and outputs the filtered signal to the synthesizer 84. The synthesizer 84 synthesizes the supplied in-phase component I signal and the quadrature component Q signal into a complex signal and outputs it to an amplitude extractor 85. The amplitude extractor 85 extracts an amplitude signal from the supplied signal and outputs it to an eye center measuring unit 86 and a zero cross point measuring unit 90.

The eye center measuring part 86, at the timing of a peak timing signal supplied from the timing signal generation circuit 33, measures the level (the level of a code judgment point (a place where an eye is open in eye pattern observation)) of the amplitude signal supplied from the amplitude extractor 85, and outputs it to an amplifier 87 and a subtracter 91.

The zero cross point measuring unit 90, using the timing of a zero cross timing signal supplied from the timing signal generation circuit 33, measures the level (the level of a code change point (a zero cross point)) of the amplitude signal supplied from the amplitude extractor 85, and outputs it to a subtracter 88 and the subtracter 91.

The amplifier 87 amplifies the signal supplied from the eye center measuring unit 86 and outputs the amplified signal to the subtracter 88. The subtracter 88 subtracts the signal indicating the level of a code judgment point, supplied from the amplifier 87, from the signal indicating the level of a code change point, supplied from the zero cross point measuring unit 90, and outputs the result to a reciprocal generating unit 89. The reciprocal generating unit 89 generates the reciprocal of the supplied signal and outputs it to a multiplier 92.

The subtracter 91 subtracts the signal indicating the level of a code change point, supplied from the zero cross point measuring unit 90, from the signal indicating the level of a code judgment point, supplied from the eye center measuring unit 86, and outputs the result to the multiplier 92.

The multiplier 92 multiplies the signal supplied from the reciprocal generating unit 89 and the signal supplied from the subtracter 91 and outputs the result to a dB converter 93. The dB converter 93 converts the supplied signal into a signal in decibels and outputs the converted signal to the display circuit 35 and the microcomputer 40.

Figure 6:
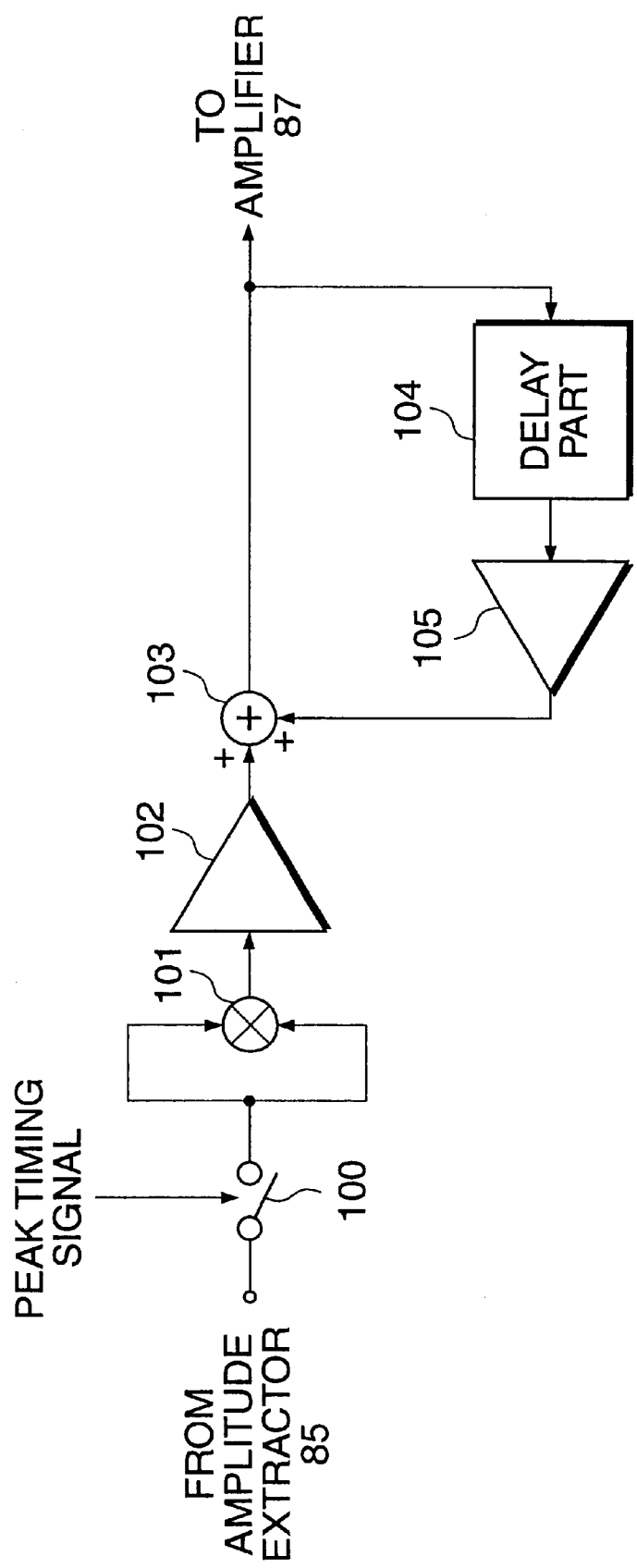
FIG. 6 is a block diagram showing a configuration of an eye center measuring apparatus 86 of FIG. 5.

FIG. 6 shows a configuration of the eye center measuring unit 86. The signal outputted from the amplitude extractor 85 of FIG. 5 is inputted to a multiplying part 101 via a switch 100. The peak timing signal supplied from the timing signal generation circuit 33 of FIG. 3 turns on or off a switch 100. A multiplying part 101 squares the supplied signal and outputs the result to an amplifying part 102. The amplifying part 102 amplifies the supplied signal and outputs the amplified signal to an adding part 103. The adding part 103 adds the signal supplied from the amplifying part 102 and the signal supplied from the amplifying part 105, and outputs the result to a delay part 104 and the amplifier 87 of FIG. 5.

The delay part 104 delays the supplied signal by a predetermined delay amount (one cycle) and outputs it to an amplifying part 105. The amplifying part 105 amplifies the supplied signal and outputs the amplified signal to an adding part 103. Namely, integration processing is performed by the adding part 103, the delay part 104, and the amplifying part 105.

Figure 7:
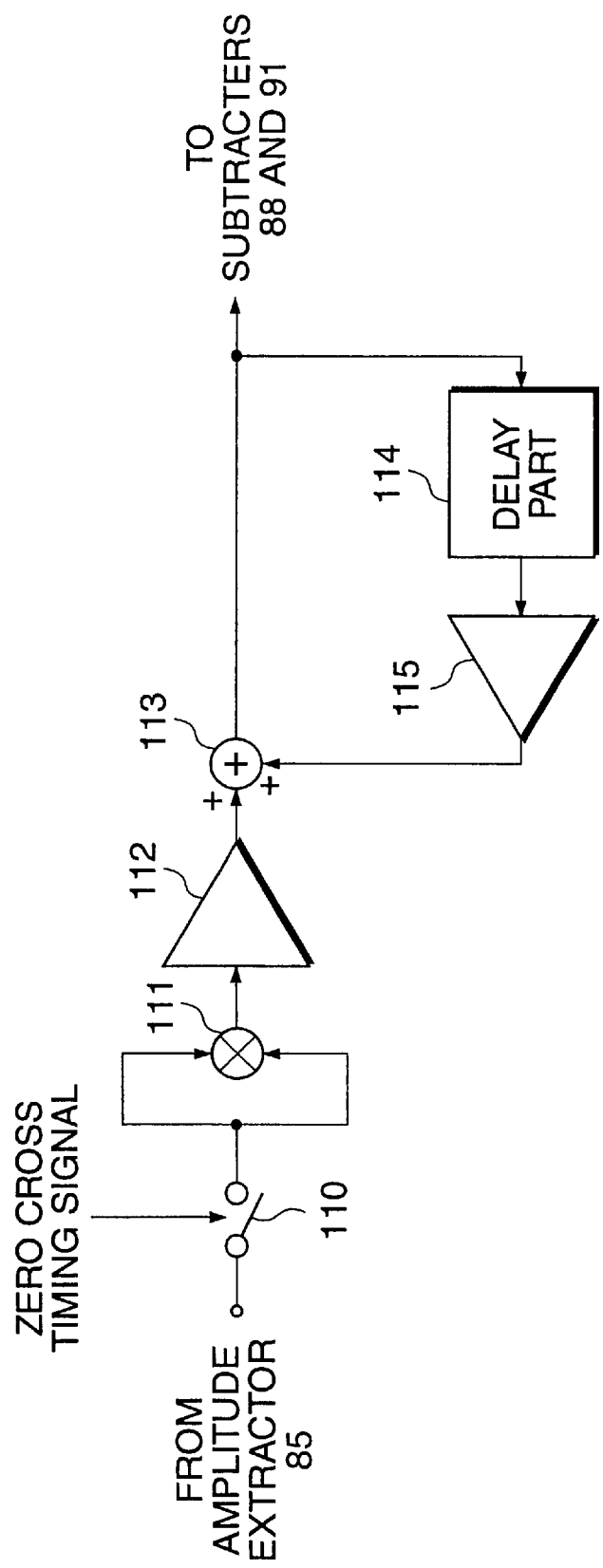
FIG. 7 is a block diagram showing a configuration of a zero cross point measuring unit 90 of FIG. 5.

FIG. 7 shows a configuration of the zero cross point measuring unit 90. The signal outputted from the amplitude extractor 85 of FIG. 5 is inputted to a multiplying part 111 via a switch 110. The zero cross timing signal supplied from the timing signal generation circuit of FIG. 3 turns on or off a switch 110. The multiplying part 111 squares the supplied signal and outputs the result to an amplifying part 112. The amplifying part 112 amplifies the supplied signal and outputs the amplified signal to an adding part 113. The adding part 113 adds the signal supplied from the amplifying part 112 and a signal supplied from an amplifying part 115, and outputs the result to a delay part 114 and the subtracters 88 and 91 of FIG. 5.

The delay part 114 delays the supplied signal by a predetermined delay amount (one-cycle clock period) and outputs the result to an amplifying part 115. The amplifying part 115 amplifies the supplied signal and outputs the amplified signal to an adding part 113. Namely, integration processing is performed by the adding part 113, the delay part 114, and the amplifying part 115.

In this way, the eye center measuring unit 86 and the zero cross point measuring unit 90 are identical in configuration, except for sampling timing.

Figure 8:
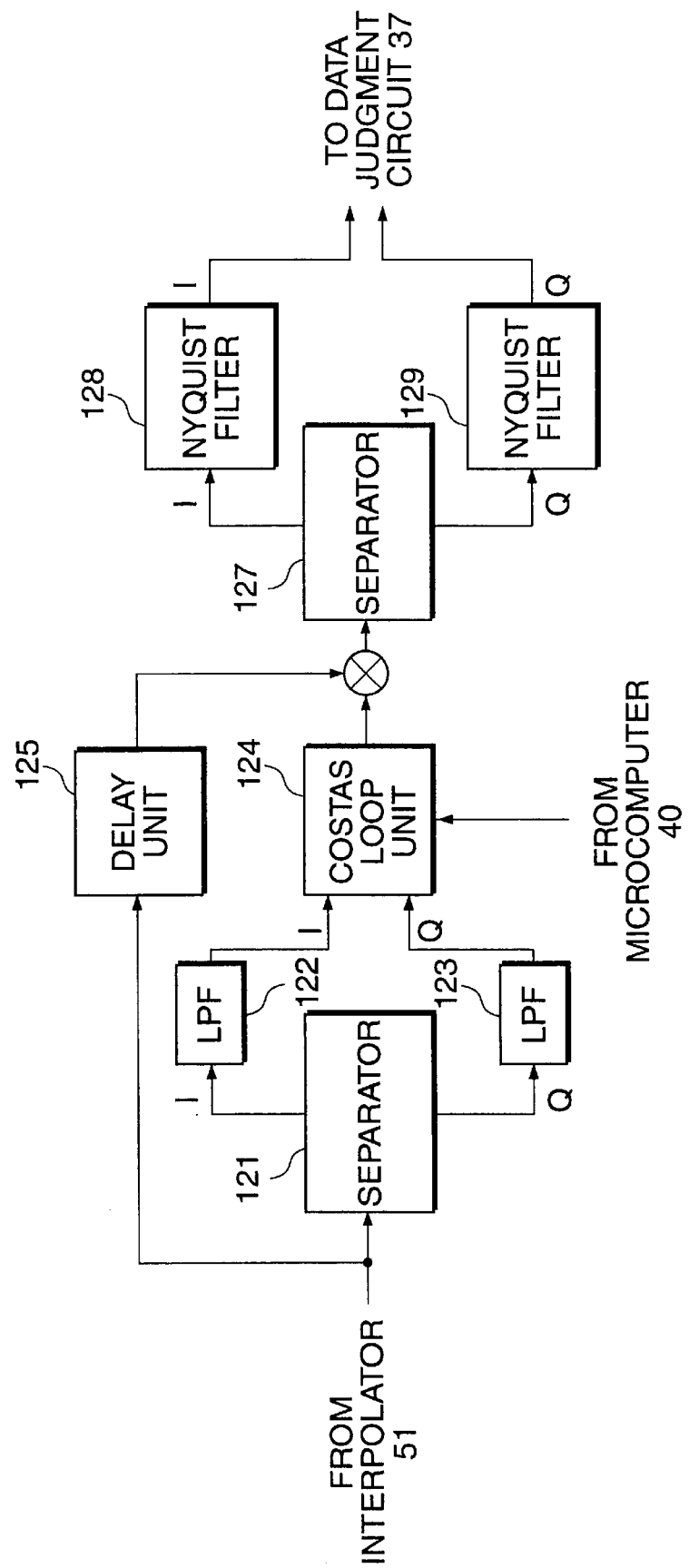
FIG. 8 is a block diagram showing a configuration of a carrier regeneration circuit 36 of FIG. 3.

FIG. 8 shows a configuration of the carrier regeneration circuit 36 of FIG. 3. An interpolated signal supplied from the interpolator 51 of the symbol clock generation circuit 32 of FIG. 4 is inputted to a separator 121 and a delay unit 125. The separator 121 separates the supplied signal into an in-phase component I signal and a quadrature component Q signal, and outputs the in-phase component I signal to LPF 122 and the quadrature component Q signal to LPF 123. The LPF 122 eliminates high-frequency components of the supplied in-phase component I signal and outputs low-frequency components thereof to the Costas loop unit 124. The LPF 123 eliminates high-frequency components of the supplied quadrature component Q signal and outputs low-frequency components thereof to the Costas loop unit 124.

The Costas loop unit 124 (will be described in detail with reference to FIG. 9) generates a carrier containing a phase error of opposite phase from the supplied signal. A multiplier 126 multiplies the carrier containing a phase error signal of opposite phase supplied from the Costas loop unit 124 and a signal delayed by a predetermined delay time (a clock period corresponding to the processing time of the separator 121, LPF 122, LPF 123, and Costas loop unit 124) to generate a carrier with a phase error component canceled out, and outputs the carrier to a separator 127. The separator 127 separates the supplied signal into an in-phase component I signal and a quadrature component Q signal, and outputs the separated in-phase component I signal to a Nyquist filter 128 and the quadrature component Q signal to a Nyquist filter 129. The Nyquist filters 128 and 129 filter the supplied signal and outputs the filtered signal to the data judgment circuit 37 of FIG. 3.

Figure 9:
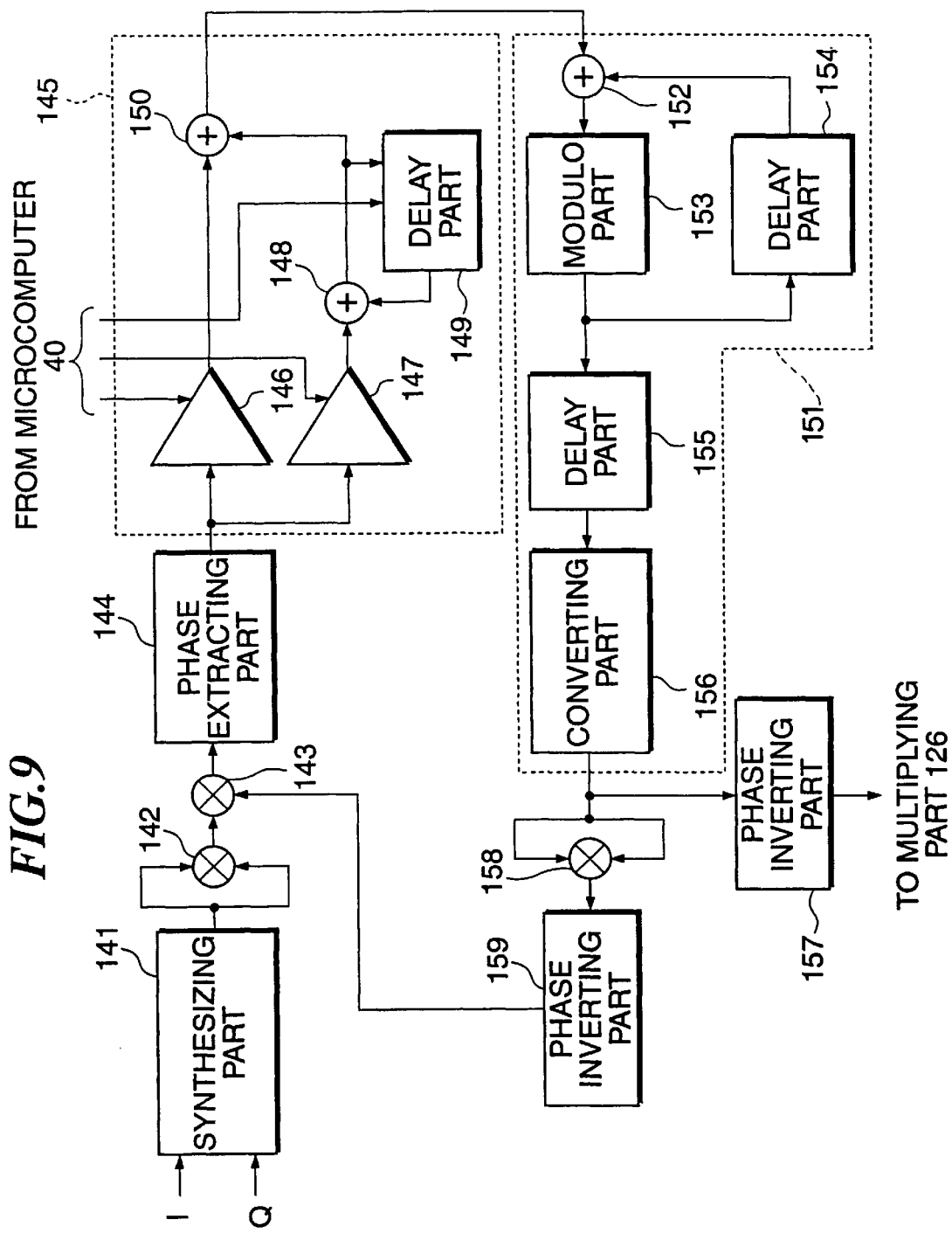
FIG. 9 is a block diagram showing a configuration of a Costas loop unit 124 of FIG. 8.

FIG. 9 shows a configuration of the Costas loop unit 124. The in-phase component I signal and the quadrature component Q signal supplied from the LPFs 122 and 123 of FIG. 8 are supplied to a synthesizing part 141. The synthesizing part 141 synthesizes the supplied in-phase component I signal and quadrature component Q signal into a complex signal and outputs it to a multiplying part 142. The multiplying part 142 squares the supplied signal and outputs the result to a multiplying part 143.

The multiplying part 143 multiplies the signal supplied from the multiplying part 142 and a signal supplied from a phase inverting part 159 and outputs a carrier containing a phase error signal corresponding to the phase error to a phase extracting part 144. The phase extracting part 144 extracts a phase component from the complex signal supplied from the multiplying part 143 and outputs it to amplifying parts 146 and 147.

The amplifying part 146, the amplification factor of which is controlled by a control signal supplied from the microcomputer 40, amplifies the phase signal supplied from the phase extracting part 144 and outputs the amplified signal to an adding part 150. The amplifying part 147 also, the amplification factor of which is controlled by a control signal supplied from the microcomputer 40, amplifies the phase signal supplied from the phase extracting part 144 and outputs the amplified signal to an adding part 148. An adding part 148 adds the signal supplied from the amplifying part 147 and a signal delayed by a predetermined delay amount (one-symbol clock period) by a delay part 149 (integrates the output of the amplifying part 147) and outputs the result to a delay part 149 and an adding part 150. The initial phase of the delay part 149 is controlled by a control signal supplied from the microcomputer 40.

The adding part 150 adds the phase signal supplied from the amplifying part 146 and the phase signal supplied from the adding part 148 and outputs the result to an adding part 152. A loop filter 145 of lang read type is formed by the amplifying part 146, the amplifying part 147, the adding part 148, the delay part 149, and the adding part 150.

The adding part 152 adds the signal supplied from the adding part 150 and a signal delayed by a predetermined delay amount (one-symbol clock period) by a delay part 154 and outputs the result to a modulo part 153. The modulo part 153 converts the phase signal supplied from the adding part 152 to a value from 0 to $2\pi$ and outputs the value to delay parts 154 and 155. The delay part 155 delays the supplied phase signal by a one-symbol clock period and then outputs it to a converting part 156. The converting part 156 converts the supplied phase signal into a complex signal and then outputs the complex signal to a phase inverting part 157 and a multiplying part 158. A VCD (Voltage Controlled Oscillator) 151 is formed by the adding part 152, the modulo part 153, the delay parts 154 and 155, and the converting part 156.

The phase inverting part 157 inverts the phase of a supplied phase signal and outputs the phase-inverted signal to the multiplying part 126 of FIG. 8 and the multiplying part 158. The multiplying part 158 squares the phase signal supplied from the converting part 156 and outputs the result to the phase inverting part 159. The phase inverting part 159 inverts the phase of the supplied phase signal and outputs the phase-inverted signal to the multiplying part 143.

Figure 10:
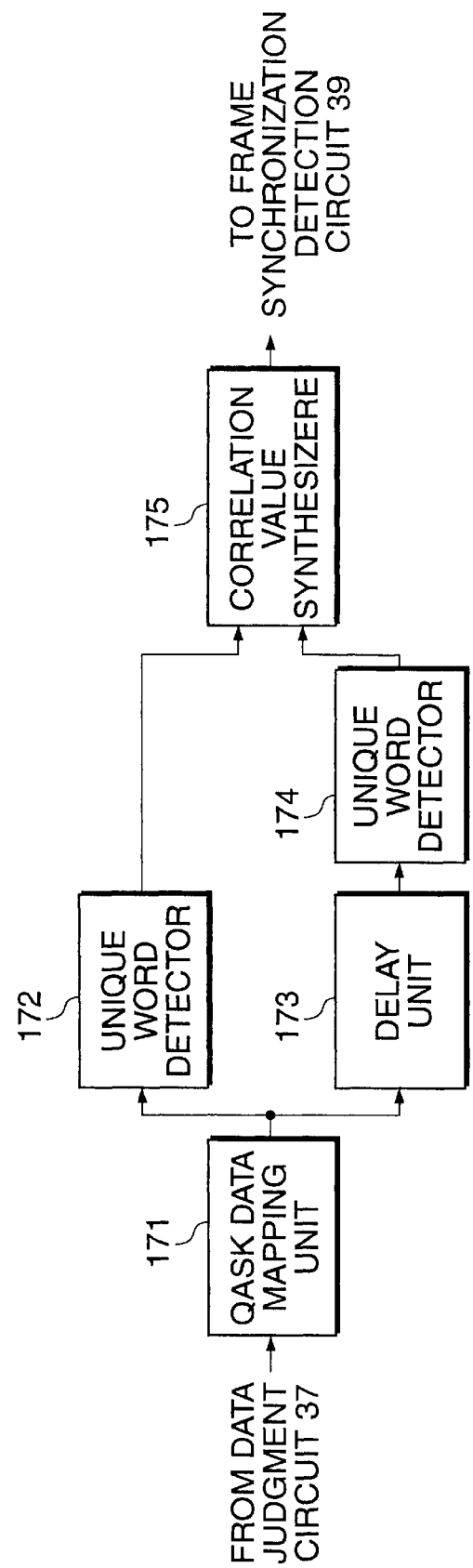
FIG. 10 is a block diagram showing a configuration of a unique word detection circuit 38 of FIG. 3.

FIG. 10 shows a configuration of the unique word detection circuit 38 of FIG. 3. A signal supplied from the data judgment circuit 37 is supplied to a QASK demapping unit 171. The QASK demapping unit 171 demaps the supplied signal and supplies the demapped signal to a unique word detector 172 and a delay unit 173.

The unique word detector 172 calculates the correlation between the value of a preset unique word W2 and the signal supplied from the QASK demapping unit 171, and outputs the correlation value to a correlation value synthesizer 175.

On the other hand, the delay unit 173 delays the supplied signal by a predetermined delay amount (a clock period corresponding to the distance between the unique words W1 and W2) and outputs it to a unique word detector 174.

The unique word detector 174 calculates the correlation between the value of a preset unique word W1 and the signal supplied from the delay unit 173, and outputs the correlation value to the correlation value synthesizer 175.

The correlation value synthesizer 175 synthesizes (adds) the correlation values from the unique word detectors 172 and 174, and when the synthesized value becomes equal to or greater than a predetermined threshold value, outputs to the frame synchronization detection circuit 39 of FIG. 3 a detection signal indicating that a unique word is detected. Specifically, when unique words W2 and W1 are detected in the unique word detectors 172 and 174, respectively, a detection signal is outputted to the correlation value synthesizer 175. The correlation value synthesizer 175 is designed to be reset when a detection signal is outputted.

Next, the operation of the sending apparatus 1, transmission line 2, and receiving apparatus 3 will be described.

First, the operation of the sending apparatus 1 will be described. A signal to be sent is supplied to the switch 11. The unique word generation part 12 generates a unique word W1 and sends it to the switch 11. The switch 11 first selects the unique word W1 supplied from the unique word generation part 12 and sends it to the switch 13. The switch 13 selects the supplied unique word W1 and supplies it to the convolution encoding part 15. Next, the switch 11 selects an inputted transmission and multiplexing configuration control signal (hereinafter referred to as a TMCC signal) and outputs it to the convolution encoding part 15 via the switch 13. Furthermore, the switch 13 selects the unique word W2 generated in the unique word generation part 14 and outputs it to the convolution encoding part 15.

The convolution encoding part 15 performs convolution encoding for the supplied unique word W1, TMCC, and unique word W2 at an encoding rate of 0.5, and supplies the result to the QASK mapping part 16. The QASK mapping part 16 mapping-modulates the data supplied from the convolution encoding part 15 to a predetermined signal and outputs an in-phase component I signal thereof and a quadrature component Q signal to the QAM modulation part 17. The QAM modulation part 17 QAM-modulates the supplied in-phase component I signal and quadrature component Q signal and supplies the result to the Nyquist filter 18. The Nyquist filter 18 filters the supplied signal and supplies the filtered signal to the quadrature modulation part 19. The quadrature modulation part 19 quadrature-modulates the supplied signal, generates a RF signal, and sends it to the transmission line 2.

The multiplying part 21 of the transmission line 2 of FIG. 2 multiplies the supplied signal by a frequency offset and outputs the result to the adding part 22. The adding part 22 adds noise to the supplied signal and sends the result to the receiving apparatus 3.

Figure 11:
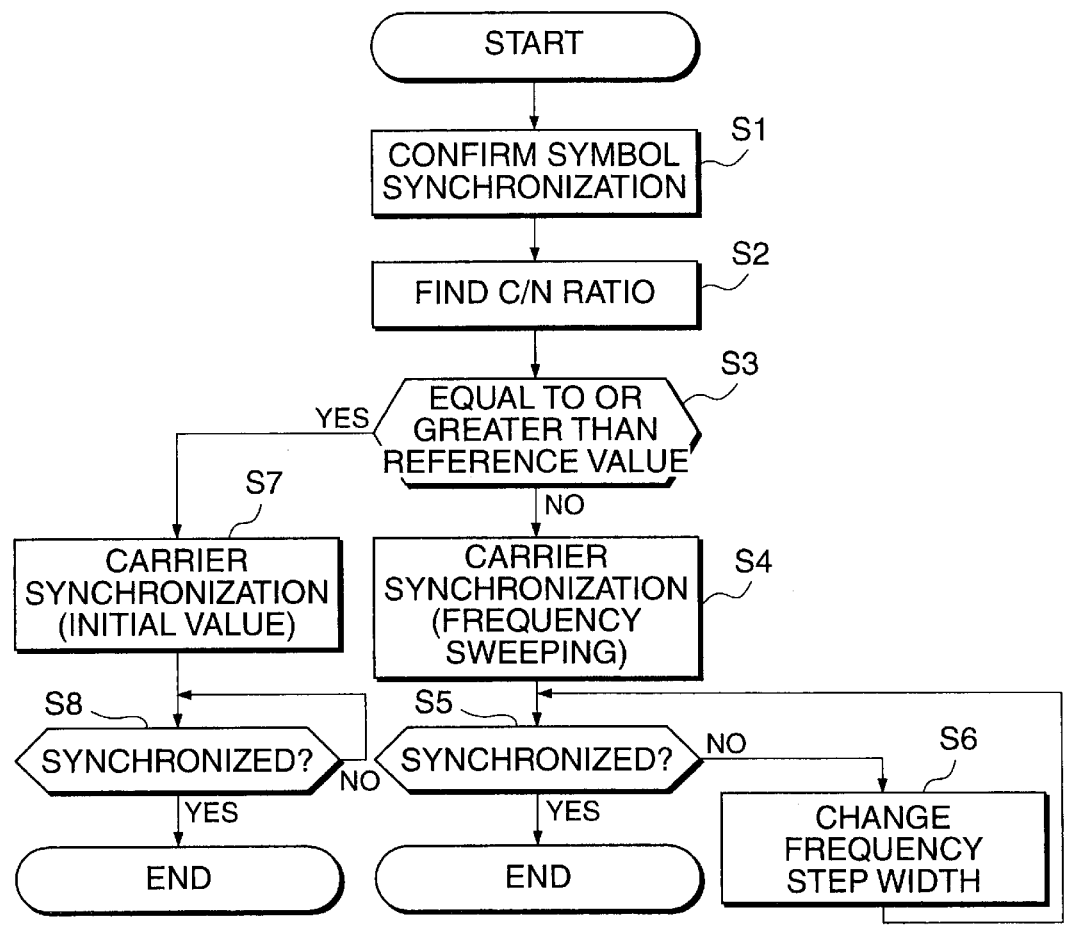
FIG. 11 is a flowchart for explaining the operation of the receiving apparatus 3 of FIG. 3.

Next, the operation of the receiving apparatus 3 will be described with reference to the flowchart of FIG. 11. A received signal is supplied to the AGC 31. The AGC 31 controls the amplitude of the supplied signal to a constant level and outputs it to the symbol clock generation circuit 32.

In step S1, the symbol clock generation circuit 32 generates a symbol clock synchronously with the phase of symbol of the signal supplied from the AGC 31. Specifically, the signal supplied to the symbol clock generation circuit 32 from the AGC 31 is supplied to the interpolator 51 of FIG. 4. The interpolator 51 interpolates the signal supplied from the AGC 31 synchronously with a symbol position supplied from the timing controller 66 and outputs the interpolated signal to the C/N meter 34 and the separating part 53 of the error detector 52.

The separating part 53 separates the signal supplied from the interpolator 51 into an in-phase component I signal and a quadrature component Q signal, outputs the in-phase component I signal to the adding part 54 and the delay part 55, and outputs the quadrature component Q signal to the adding part 58 and the delay part 59.

The adding part 54 adds the in-phase component I signal supplied from the separating part 53 and a signal delayed by a one-symbol clock period by the delay part 55 and outputs the result to the average value generation part 56. The average value generation part 56 finds the average of the supplied signals and outputs it to the multiplying part 57. The multiplying part 57 squares the supplied signals and outputs the result to the adding part 62.

The adding part 58 adds the quadrature component Q signal supplied from the separating part 53 and a signal delayed by a one-symbol clock period by the delay part 59 and outputs the result to the average value generation part 60. The average value generation part 60 finds the average of the supplied signals and outputs it to the multiplying part 61. The multiplying part 61 squares the supplied signals and outputs the result to the adding part 62.

The adding part 62 adds the signals supplied from the multiplying parts 57 and 61, and outputs the result to the subtracting part 63 and the delay part 64. The subtracting part 63 subtracts a signal delayed by a one-symbol clock period by the delay part 64 from the signal supplied from the adding part 62 and outputs an error signal indicating an error between them to the LPF 65. The error signal is an error signal corresponding to a deviation of the symbol position of the interpolated signal supplied to the error detector 52.

The LPF 65 outputs the supplied signal to the timing controller 66 by eliminating high-frequency components thereof and passing low-frequency components thereof. The timing controller 66 generates a symbol position from the supplied signal and outputs it to the timing signal generation circuit 33 and the interpolator 51.

The timing signal generation circuit 33 generates a peak timing signal and a zero cross timing signal, based on the supplied symbol position, and outputs the peak timing signal to the eye center measuring unit 86 of the C/N meter 34 of FIG. 5, and outputs the zero cross timing signal to the zero cross point measuring unit 90 of the C/N meter 34 of FIG. 5.

In step S2, the C/N meter 34 determines a C/N ratio from the zero cross timing signal and peak timing signal supplied from the timing signal generation circuit 33, and the interpolated signal supplied from the symbol clock generation circuit 32. Specifically, the interpolated signal supplied from the symbol clock generation circuit 32 is supplied to the separator 81 of the C/N meter 34. The separator 81 separates the supplied signal into an in-phase component I signal and a quadrature component Q signal, and outputs the in-phase component I signal to the Nyquist filter 82 and the quadrature component Q signal to the Nyquist filter 83. The Nyquist filter 82 filters the supplied in-phase component I signal and outputs the filtered signal to the synthesizer 84. The Nyquist filter 83 filters the supplied quadrature component Q signal and outputs the filtered signal to the synthesizer 84. The synthesizer 84 synthesizes the supplied in-phase component I signal and quadrature component Q signal into a complex signal and outputs the complex signal to the amplitude extractor 85. The amplitude extractor 85 extracts amplitude from the supplied signal and outputs it to the eye center measuring unit 86 and the zero cross point measuring unit 90.

The amplitude signal from the amplitude extractor 85, supplied from the eye center measuring unit 86 is supplied to the multiplying part 101 via the switch 100. The switch 100 is turned on based on the peak timing signal from the timing signal generation circuit 33 of FIG. 3. Accordingly, the multiplying part 101 is supplied with the amplitude signal supplied from the amplitude extractor 85 at the timing of the peak timing signal supplied from the timing signal generation circuit 33. The multiplying part 101 squares the supplied signal and outputs the result to the amplifying part 102. The multiplying part 101 squares the supplied signal and outputs the squared signal to the amplifying part 102. The amplifying part 102 amplifies the supplied signal and outputs the amplified signal to the adding part 103. The adding part 103 adds the signal supplied from the amplifying part 102 and the signal supplied from the amplifying part 105, and outputs the added signal to the delay part 104 and the amplifier 87 of FIG. 5. The signal outputted from the adding part 103 is used as a signal to indicate the level of a code judgment point. The signal supplied from the amplifying part 105 is the one amplified by the amplifying pat 105, delayed by a predetermined delay amount (one-sample clock period) by the delay part 104.

On the other hand, the amplitude signal supplied to the zero cross point measuring unit 90 from the amplitude extractor 85 is supplied to the multiplying part 111 via the switch 110. The switch 110 is turned on based on the zero cross timing signal from the timing signal generation circuit 33 of FIG. 3. Accordingly, the multiplying part 111 is supplied with the amplitude signal supplied from the amplitude extractor 85 at the timing of the zero cross timing signal supplied from the timing signal generation circuit 33. The multiplying part 111 squares the supplied signal and outputs the squared signal to the amplifying part 112. The amplifying part 112 amplifies the supplied signal and outputs the amplified signal to the adding part 113. The adding part 113 adds the signal supplied from the amplifying part 112 and the signal supplied from the amplifying part 115, and outputs the added signal to the delay part 114 and the subtracters 88 and 91 of FIG. 5. The signal outputted from the adding part 113 is used as a signal to indicate the level of a code judgment point. The signal supplied from the amplifying part 115 is the one amplified by the amplifying pat 115, delayed by a predetermined delay amount (one-sample clock period) by the delay part 114.

Herein, for example, assume that power at a code judgment point where there is no noise is expressed as a formula C=bs0 and power at a code change point is expressed as a formula aC=bi0. For signals with energy diffused for a sufficient long period of time, the variable a becomes a constant value although it depends on a modulation method. In this case, power at a code judgment point when noise is applied is expressed as a formula C+N=bs, and power at a code change point is expressed as a formula C+N=bi. A power signal bs at a code change point is outputted from the eye center measuring unit 86 and a power signal bi at a code change point is outputted from the zero cross point measuring unit 90. As a, e.g., a numeric value 0.8375 is used.

The code judgment point power signal bs outputted from the adding part 103 of the eye center measuring unit 86 of FIG. 6 is supplied to the amplifier 87 of FIG. 5. The amplifier 87 amplifies the supplied signal 0.8375 times (=a) and outputs a power signal 0.8375×bs to the adding part 88.

The signal outputted from the adding part 113 of the zero cross point measuring unit 90 of FIG. 7 is supplied to the subtracter 91 of FIG. 5 and the subtracter 88. The subtracter 91 subtracts the code change point power signal bi from the supplied code judgment point power signal bs and outputs a power signal (bs−bi) to the multiplier 92.

The subtracter 88 subtracts the code judgment power signal 0.8375×bs supplied from the amplifier 87 from the code change point power signal bi supplied from the zero cross point measuring unit 90, generates a power signal (bi−0.8375×bs), and outputs it to the reciprocal generating unit 89.

The reciprocal generating unit 89 generates the reciprocal of the supplied power signal (bi−0.8375×bs) and outputs the power signal 1/(bi−0.8375×bs) to the multiplier 92.

The multiplier 92 multiplies the power signal 1/(bi−0.8375×bs) supplied from the reciprocal generating unit 89 and the power signal (bs−bi) supplied from the subtracter 91, generates a power signal (bs−bi)/(bi−0.8375 ×bs), and outputs it to the dB converter 93. The dB converter 93 converts the supplied signal into a signal in decibels, and outputs the converted signal to the display circuit 35 and the microcomputer 40.

The display circuit 35 displays the supplied signal. Although a description will be made later with reference to FIG. 16, an output from the C/N meter 34 has a one-to-one correspondence with a C/N ratio and a C/N ratio can be estimated from an output from the C/N meter 34.

In step S3, the microcomputer 40 compares the signal supplied from the C/N meter 34 with a preset threshold value and judges whether a difference from the threshold value is equal to or greater than a preset reference value. If the difference is equal to or greater than a preset reference value, the microcomputer 4 proceeds to step S4, and controls the carrier regeneration circuit 36 so that frequencies are swept to perform carrier synchronization.

Specifically, the interpolated signal outputted from the interpolator 51 of the symbol clock regeneration circuit 32 is supplied to the separator 121 and delay unit 125 of the carrier regeneration circuit of FIG. 8. The separator 121 separates the supplied signal into an in-phase component I signal and a quadrature component Q signal, and outputs the in-phase component I signal to LPF 122 and the quadrature component Q signal to LPF 123. The LPF 122 eliminates high-frequency components of the supplied in-phase component I signal and outputs low-frequency components thereof to the Costas loop unit 124. The LPF 123 eliminates high-frequency components of the supplied quadrature component Q signal and outputs low-frequency components thereof to the Costas loop unit 124.

The delay unit 125 delays the supplied signal by a predetermined delay time (a clock period corresponding to the processing time of the separator 121, LPF 122, LPF 123, and Costas loop unit 124) and outputs it to the multiplier 126.

The in-phase component I signal and the quadrature component Q signal supplied from the LPFs 122 and 123 are supplied to the synthesizing part 141 of the Costas loop unit 124 of FIG. 9. The synthesizing part 141 synthesizes the supplied in-phase component I signal and quadrature component Q signal into a complex signal and outputs it to a multiplying part 142. The multiplying part 142 squares the supplied signal and outputs the result to the multiplying part 143.

The multiplying part 143 multiplies the signal supplied from the multiplying part 142 and a signal supplied from the phase inverting part 159 and outputs a phase error signal corresponding to the phase error to the phase extracting part 144. The phase extracting part 144 extracts a phase signal from the complex signal supplied from the multiplying part 143 and outputs it to the amplifying parts 146 and 147.

The amplifying part 146 amplifies the phase signal supplied from the phase extracting part 144 based on an amplification factor supplied from the microcomputer 40 and outputs the amplified signal to the adding part 150. The amplifying part 147 also amplifies the phase signal supplied from the phase extracting part 144 based on the amplification factor supplied from the microcomputer 40 and outputs the amplified signal to the adding part 148. The adding part 148 adds the signal supplied from the amplifying part 147 and a signal delayed by a predetermined delay amount (one-symbol clock period) by the delay part 149 and outputs the result to the delay part 149 and the adding part 150. The adding part 150 adds the phase signal supplied from the amplifying part 146 and the phase signal supplied from the adding part 148 and outputs the result to the adding part 152.

The adding part 152 adds the signal supplied from the adding part 150 and a signal delayed by a predetermined delay amount (one-symbol clock period) by the delay part 154 and outputs the added signal to the modulo part 153. The modulo part 153 converts the phase signal supplied from the adding part 152 to a value from 0 to $2\pi$ and outputs the value to the delay parts 154 and 155. The delay part 155 delays the supplied phase signal by a one-symbol clock period and then outputs it to the converting part 156. The converting part 156 converts the supplied phase signal into a complex signal and then outputs the complex signal to the phase inverting part 157 and the multiplying part 158. The phase inverting part 157 inverts the phase of the supplied phase signal and outputs the phase-inverted signal to the multiplying part 126 of FIG. 8 and the multiplying part 158. The signal supplied to the multiplying part 143 from the phase inverting part 159 is the signal supplied from the converting part 156, squared in the multiplying part 158 and phase-inverted in the phase inverting part 159.

The multiplier 126 of FIG. 8 multiplies a frequency error signal of a carrier supplied by the Costas loop unit 124 and a signal delayed by a predetermined time by the delay unit 125 and outputs the result to the separator 127. The signal outputted to the separator 127 is a carrier freed of a phase error. The separator 127 separates the supplied signal into an in-phase component I signal and a quadrature component Q signal, and outputs the in-phase component I signal to the Nyquist filter 128 and the quadrature component Q signal to the Nyquist filter 129. The Nyquist filters 128 and 129 filter the supplied signals and outputs the filtered signals to the data judgment circuit 37 of FIG. 3.

Figure 12:
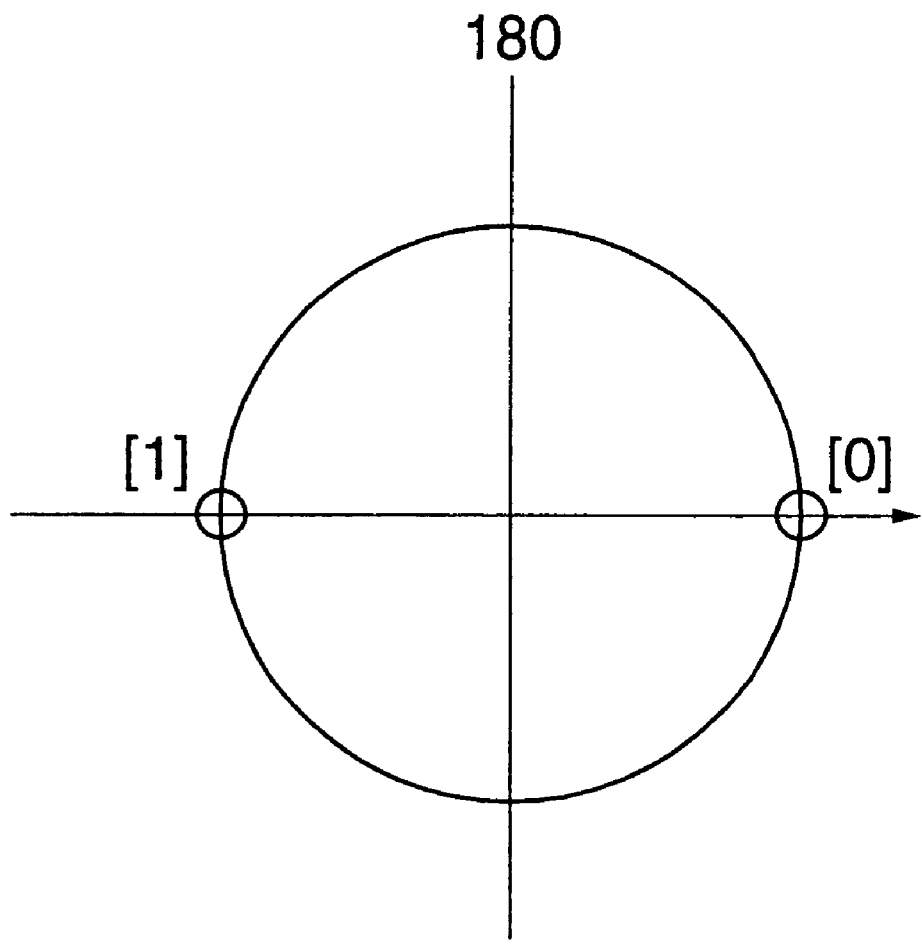
FIG. 12 is a flowchart for explaining the operation of a data judgment circuit 37 of FIG. 3.

The operation of the data judgment circuit 37 will be described with reference to FIG. 12. FIG. 12 shows a symbol mapping of BPSK modulation method. The data judgment circuit 37 is beforehand provided with a threshold value for a set (I, Q) of in-phase component I and quadrature component W. For example, a threshold value 180 (a threshold value indicated by a line 180) is set for an in-phase component I signal. The data judgment circuit 37, when a supplied in-phase component I signal is greater than, e.g., a preset threshold value 180 (that is, when the in-phase component I is greater than 0), judges that a symbol [0] is detected, demodulates the detected symbol, and outputs it to the unique word detection circuit 38 of FIG. 10. When an in-phase component Q signal supplied from the Nyquist filter 129 of the carrier regeneration circuit 36 of FIG. 8 is smaller than, e.g., a preset threshold value 180 (that is, when the in-phase component Q is smaller than 0), the data judgment circuit 37 judges that a symbol [1] is detected, demodulates the detected symbol, and outputs it to the unique word detection circuit 38 of FIG. 10.

A signal outputted from the data judgment circuit 37 of FIG. 3 is supplied to the QASK demapping unit 171 of the unique word detection circuit 38 of FIG. 10. The QASK demapping unit 171 demaps the supplied signal and supplies the demapped signal to the unique word detector 172 and the delay unit 173.

The unique word detector 172 calculates the correlation between the value of a preset unique word W2 and the signal supplied from the QASK demapping unit 171, and outputs the correlation value to the correlation value synthesizer 175.

On the other hand, the delay unit 173 delays the supplied signal by a predetermined delay amount (a clock period corresponding to the distance between the unique words W1 and W2) and outputs it to a unique word detector 174.

The unique word detector 174 calculates the correlation between the value of a preset unique word W1 and the signal supplied from the QASK demapping unit 171, and outputs the correlation value to the correlation value synthesizer 175.

The correlation value synthesizer 175 synthesizes (adds) the correlation values from the unique word detectors 172 and 174, and when the synthesized value becomes equal to or greater than a predetermined threshold value, outputs to the frame synchronization detection circuit 39 of FIG. 3 a detection signal indicating that a unique word is detected. Specifically, when unique words W2 and W1 are detected in the unique word detectors 172 and 174, respectively, a detection signal is outputted to the correlation value synthesizer 175.

Figure 13:
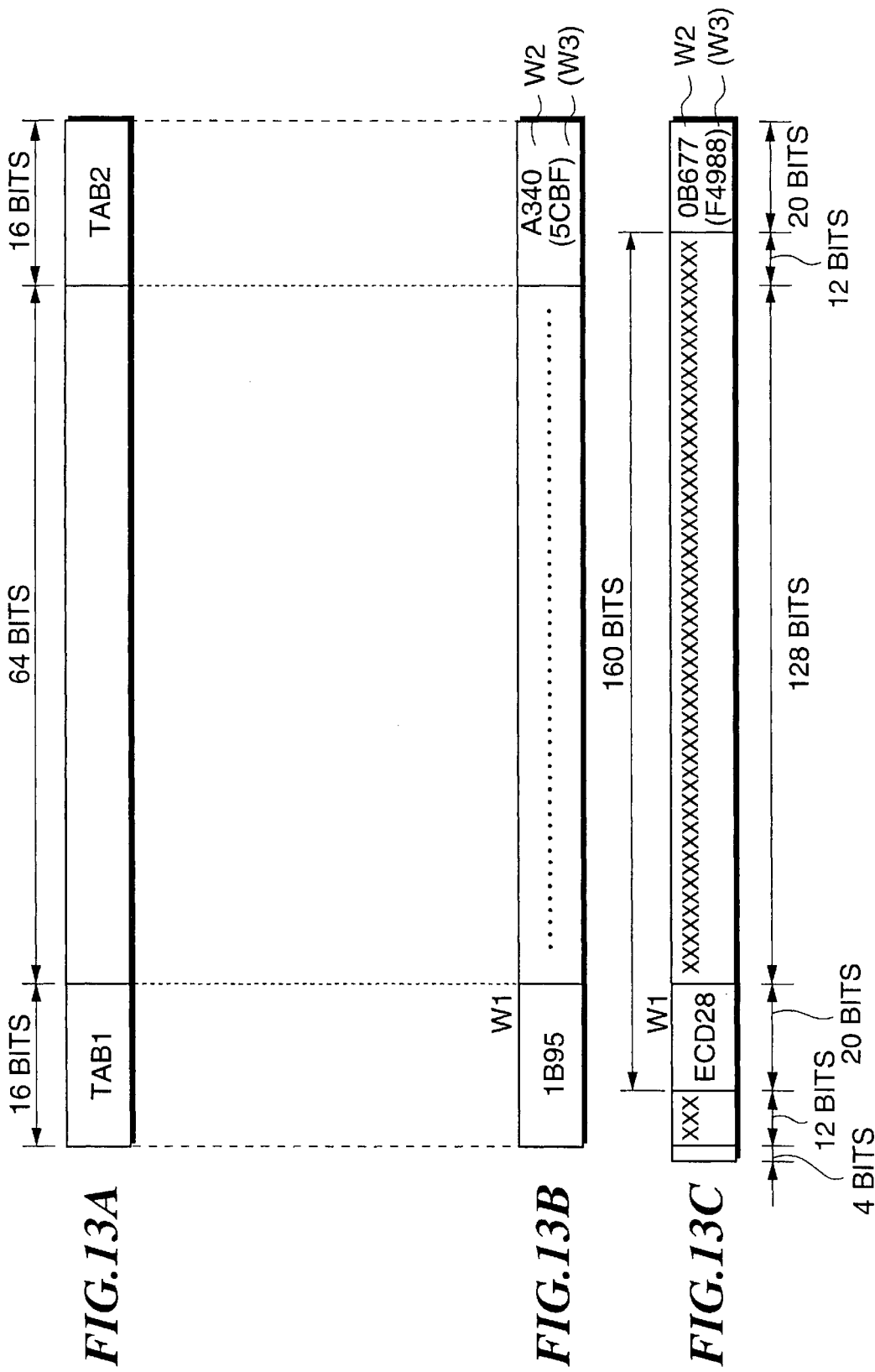
FIG. 13 is a flowchart for explaining the operation of a unique word detection circuit 38 of FIG. 3.

The operation of the unique word detectors 172 and 174 will be described in detail with reference to FIG. 13. First, a signal supplied to the unique word detector 172 will be described. In the signal, as shown in FIG. 13A, one frame consists of 96 bits, and unique words W1 and W2 are placed in the first 16 bits (TAB1) and the last 16 bits (TAB2), respectively, as shown in FIG. 13B. To be more specific, of superframes formed by eight frames, a unique word W1 is placed in TAB1, which designates the beginning of a frame, and a unique word W2 is placed in TAB2, which designates the end thereof. However, in the remaining seven frames, although a unique word W1 is placed in TAB1, a unique word W3 is placed in TAB2. In this example, a value (1B95) is set as a unique word w1, a value (A340) is set as a unique word W2, and a value (5CBF) is set as a unique word W3 (these values all are in hexadecimal notation). As 64-bit data, TMCC containing transmission information such as a modulation method, an encoding rate, and the like is placed.

FIG. 13C shows a signal for which convolution encoding is performed at an encoding rate of 0.5. The first four bits are the last four bits of a previous signal. Since the signal, except for the four bits, is subjected to convolution encoding, it is defined as a signal of 192 bits in total. The respective first 12 bits of portions (each 32 bits) corresponding to the unique words W1 and W2 of the 192 bits cannot be used as a unique word because they have been encoded together with bits of a previous signal during convolution encoding. Accordingly, the remaining 20 bits are used as a unique word and the first bit of a unique word W1 is 160 bits away from the first bit of a unique word W2 (a delay corresponding to the number of bits is afforded by the delay unit 173 of FIG. 10.).

Next, the operation of the unique word detectors 172 and 174 will be described on the assumption that, e.g., a signal shown in FIG. 13C is supplied. The unique word detector 172 is beforehand provided with a 20-bit unique word W2. The unique word detector 174 calculates the correlation with a supplied signal on a bit-by-bit basis, and outputs 1 when a match is found and −1 when no match is found, to the correlation value synthesizer 175. For example, if a calculated correlation value is 18, the correlation value 18 is outputted to the correlation value synthesizer 175.

On the other hand, to the unique word detector 174, a signal is supplied a clock period corresponding to the distance (specifically 160 bits) between the unique words W2 and W1 later than a signal supplied to the unique word detector 172. Thereby, at the timing when the unique word W2 is inputted to the unique word detector 172, the unique word W1 is inputted to the unique word detector 174. The unique word detector 174 calculates the correlation with a supplied signal on a bit-by-bit basis, and outputs 1 when a match is found and −1 when no match is found, to the correlation value synthesizer 175. For example, if a calculated correlation value is 18, the correlation value 18 is outputted to the correlation value synthesizer 175.

The correlation value synthesizer 175 synthesizes (adds) the correlation values from the unique word detectors 172 and 174, and when the synthesized value becomes equal to or greater than a predetermined threshold value, outputs to the frame synchronization detection circuit 39 of FIG. 3 a detection signal indicating that a unique word is detected. Specifically, when unique words W2 and W1 are detected in the unique word detectors 172 and 174, respectively, a detection signal is outputted to the correlation value synthesizer 175. Thereby, a time reference (synchronization signal) for demodulating BPSK, QPSK, or 8PSK signals is obtained.

Referring back to FIG. 11, in step S5, the frame synchronization detection circuit 39 determines from a supplied signal whether frames synchronize, and outputs the result to the microcomputer 40. Details of processing of the frame synchronization detection circuit 39 are given in the flowchart of FIG. 14. Namely, in step S21 of FIG. 14, the frame synchronization detection circuit 39 judges whether a detection signal is inputted from the unique word detection circuit 38. In step S21, when it is judged that a detection signal is inputted, control proceeds to step S22.

In step S22, the frame synchronization detection circuit 39 judges whether the detection signal was inputted three times successively from the unique word detection circuit 38. If the detection signal was inputted three times successively from the unique word detection circuit 38, in step S23, a frame synchronization detection signal is outputted to the microcomputer 40 and control is transferred to step S24. Although frame synchronization has been established at this point, thereafter if the detection signal has not been inputted three times successively, control is transferred to step S25. This means the state in which frame synchronization has not been taken for some reason. In this case, control is transferred to step S25 to output a frame non-synchronization detection signal to the microcomputer 40. For the following two reasons, the existence of input of a detection signal is determined by judging whether the detection signal was inputted three times successively: reducing the number of erroneous detections, and avoiding erroneous judgment of out of synchronization.

Referring back to FIG. 11, in step S5, the microcomputer 40 judges, from the detection result supplied from the frame synchronization detection circuit 39, whether frames synchronize. On judging that frames synchronize, the microcomputer 40 terminates processing, and on judging that frames do not synchronize, the microcomputer 40, in step S6, outputs a signal for changing a frequency step width to the carrier regeneration circuit 36 (changes the initial value of the Costas loop unit 124 of FIG. 9). This processing is repeated until it is judged in step S5 that frames synchronize.

If it is judged in step S5 that frames synchronize, the carrier regeneration circuit 36 regenerates a carrier with the frequency step width supplied from the microcomputer 40 and outputs it to the data judgment circuit 37 (a description of detailed processing of the carrier regeneration circuit 36 is omitted because of the same as the above description).

On the other hand, if it is judged in step S3 that the microcomputer 40 judges that the difference between the signal supplied from the C/N meter 34 and a predetermined threshold value is equal to or greater than a predetermined reference value, in step S7, the microcomputer 40 outputs a signal for initializing the error of a sweep frequency and a loop noise bandwidth (the amplification factors of the amplifying parts 146 and 147 of FIG. 9 are set to a predetermined value and a predetermined initial value is set to the delay part 149). The carrier regeneration circuit 36 regenerates a carrier with the supplied, initialized frequency error and noise bandwidth and outputs it to the data judgment circuit 37 (a description of detailed processing of the carrier regeneration circuit 36 is omitted because it is the same as the above description).

The data judgment circuit 37 judges, from the signal supplied from the carrier regeneration circuit 36, whether a symbol could be detected, based on a preset threshold value, and on judging that a symbol could be detected, demodulates the detected symbol and outputs the demodulated signal to the unique word detection circuit 38 (a description of detailed processing of the data judgment circuit 37 is omitted because it is the same as the above description).

The unique word detection circuit detects a unique word from the supplied signal, synthesizes a correlation value, and when the value becomes equal to or greater than a predetermined threshold value, outputs to the frame synchronization detection circuit 39 a detection signal indicating that the unique word is detected (a description of detailed processing of the unique word detection circuit 38 is omitted because it is the same as the above description).

The frame synchronization detection circuit 39 determines whether frames synchronize, from the supplied signal, and outputs the detection result to the microcomputer 40 (a description of detailed processing of the frame synchronization detection circuit 39 is omitted because it is the same as the above description).

In step S8, the microcomputer 40 judges from the supplied detection result whether frame synchronization is established, waits in step s8 until it is judged that frame synchronization is established, and terminates processing when it is judged that frame synchronization is established.

As described above, according to the receiving apparatus 3 of FIG. 3, since the difference of between levels at a code judgment point and a code change point is detected after symbol synchronization is established, a C/N ratio can be estimated.

Figure 15:
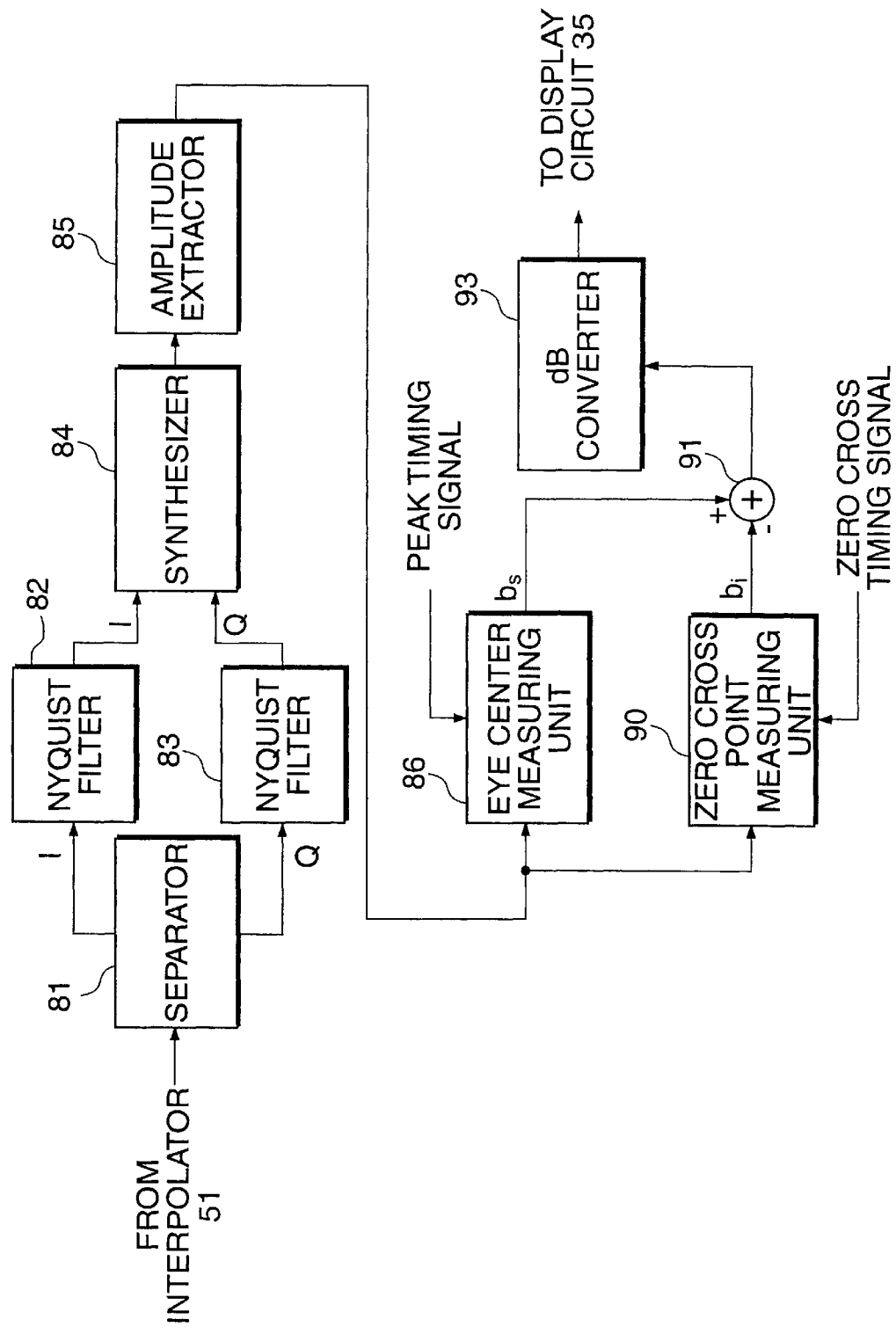
FIG. 15 is a block diagram showing another configuration of a C/N meter 34 of FIG. 3.

Although the C/N meter 34 of FIG. 5 is used for the C/N meter 34 in the above processing, the C/N meter 34 of FIG. 15 may also be used. The C/N meter 34 of FIG. 15 is the same as the C/N meter 34 of FIG. 5, except that the amplifier 87, subtracter 88, reciprocal generating unit 89, subtracter 91, and multiplier 92 are excluded. Namely, the output of the subtracter 91 is inputted to the dB converter 93 without modification. The dB converter 93 converts the supplied signal into a signal in decibels, so that a C/N ratio can be detected as a whole.

Figure 16:
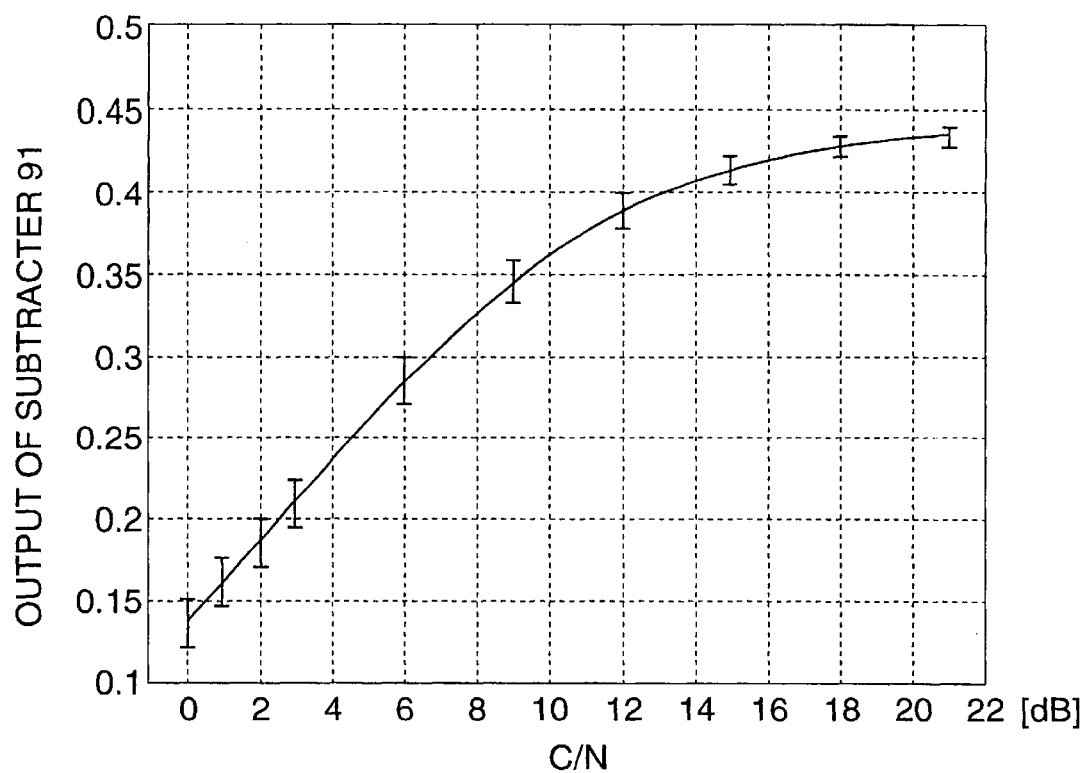
FIG. 16 is a diagram showing the output characteristics of the C/N meter 34 of FIG. 15.

FIG. 16 takes C/N ratios in the horizontal axis and the outputs of the C/N meter 34 in the vertical axis, thereby showing the output characteristics of the C/N meter 34 when BPSK and 8PSK modulation methods coexist (data all is 8PSK-modulated). As described above, C/N ratios and the outputs of the C/N meter 34 have a one-to-one correspondence although a curve showing the relationship between them goes up or down depending on a modulation method. Thereby, it can be appreciated that a C/N ratio can be estimated from an output from the C/N meter 34.

In this specification, the term system refers to an overall apparatus comprising a plurality of apparatuses, units, and the like.

What is claimed is:

1. An information processing apparatus that receives and processes digital data transmitted through a transmission line, the apparatus comprising:

amplitude value detection means for detecting an amplitude value of a received signal;

code judgment detection means for detecting a code judgment point based on the amplitude value detected by said amplitude value detection means;

code change point detection means for detecting a code change point based on the amplitude value detected by said amplitude value detection means;

noise detection means for detecting signal noise from the code judgment point detected by said code judgment detection means and the code change point detected by said code change point detection means;

symbol clock signal synchronous with a symbol of the received signal, wherein said code point detection means and said code change point detection means perform said respective detecting after symbol synchronization is established by said symbol clock generation means; and carrier regeneration means connected to said symbol clock generation means for performing carrier regeneration, wherein whether to perform frequency sweeping in said carrier regeneration means is based on a detection result of said noise detection means.

2. The information processing apparatus set forth in claim 1, further comprising frame synchronization establishment means for establishing frame synchronization by use of unique words contained in said digital data, wherein it is decided in said frame synchronization establishment means whether frame synchronization can be established after said frequency sweeping, and when frame synchronization cannot be established, frequency sweeping is performed again.

3. The information processing apparatus set forth in claim 2, wherein said frame synchronization establishment means determines whether frame synchronization has been established by monitoring whether said unique words are detected a plurality of times successively.

4. The information processing apparatus set forth in claim 1, further comprising frame synchronization establishment means for establishing frame synchronization by use of unique words contained in said digital data, wherein, when it is decided based on a detection result of said noise detection means that frequency sweeping is not performed, frame synchronization is established by said frame synchronization establishment means.

5. The information processing apparatus set forth in claim 4, wherein said frame synchronization establishment means determines whether frame synchronization has been established by monitoring whether said unique words are detected a plurality of times successively.

6. An information processing method that receives and processes digital data transmitted through a transmission line, comprising:

an amplitude value detection step for detecting an amplitude value of a received signal;

a code judgment detection step for detecting a code judgment point based on the amplitude value detected by said amplitude value detection step;

a code change point detection step for detecting a code change point based on the amplitude value detected by said amplitude value detection step;

a noise detection step for detecting signal noise from the code judgment point detected by said code judgment detection step and the code change point detected by said code change point detection step;

a symbol clock generation step for generating a symbol clock signal synchronous with a symbol of the received signal, wherein said code point detection step and said code change point detection step are performed after symbol synchronization is established by said symbol clock generation step; and a carrier regeneration step for performing carrier regeneration, wherein whether to perform frequency sweeping in said carrier regeneration step is decided based on a signal detection result of said noise detection step.

7. The information processing method set forth in claim 6, further comprising a frame synchronization establishment step for establishing frame synchronization by use of unique words contained in said digital data, wherein it is decided in said frame synchronization establishment step whether frame synchronization can be established after said frequency sweeping and, when frame synchronization cannot be established, frequency sweeping is performed again.

8. The information processing method set forth in claim 7, wherein said frame synchronization establishment step determines whether frame synchronization has been established by monitoring whether said unique words are detected a plurality of times successively.

9. The information processing method set forth in claim 6, further comprising a frame synchronization establishment step for establishing frame synchronization by use of unique words contained in said digital data, wherein, when it is decided based on a detection result of said noise detection step that frequency sweeping is not performed, frame synchronization is established by said frame synchronization establishment step.

10. The information processing method set forth in claim 9, wherein said frame synchronization establishment step determines whether frame synchronization has been established by monitoring whether said unique words are detected a plurality of times successively.

\* \* \* \* \*